United States Patent [19]

Lahm

[11] Patent Number: 4,700,442
[45] Date of Patent: Oct. 20, 1987

[54] TOOL CHANGING APPARATUS FOR A MACHINE TOOL

[75] Inventor: Heinrich Lahm, Neuhausen/Filder, Fed. Rep. of Germany

[73] Assignee: Index-Werke Komm.-Ges. Hahn & Tessky, Esslingen, Fed. Rep. of Germany

[21] Appl. No.: 867,796

[22] Filed: May 23, 1986

[30] Foreign Application Priority Data

Jun. 1, 1985 [DE] Fed. Rep. of Germany ....... 3519754

[51] Int. Cl.$^4$ .............................................. B23B 29/24
[52] U.S. Cl. .......................................... 29/39; 29/568
[58] Field of Search ........................... 29/568, 39, 38; 82/36 A, 36 B

[56] References Cited

U.S. PATENT DOCUMENTS 4,414,724  11/1983  Garnett .................................. 29/39

FOREIGN PATENT DOCUMENTS

| 23351 | 2/1981 | European Pat. Off. | 29/568 |
| 1602810 | 6/1970 | Fed. Rep. of Germany | 29/568 |
| 2700726 | 7/1978 | Fed. Rep. of Germany | 29/568 |
| 2759093 | 7/1979 | Fed. Rep. of Germany | 29/568 |
| 3324312 | 10/1984 | Fed. Rep. of Germany | 29/568 |
| 2391811 | 1/1979 | France | 29/568 |
| 139805 | 1/1980 | German Democratic Rep. | 29/568 |
| 141481 | 5/1980 | German Democratic Rep. | 29/568 |
| 656803 | 4/1979 | U.S.S.R. | 29/568 |

Primary Examiner—William R. Briggs
Attorney, Agent, or Firm—Shenier & O'Connor

[57] ABSTRACT

A tool changing apparatus for a machine tool comprising, adjacent an operating space, an indexable tool carrier displaceable in two feed directions defining a plane of movement and comprising a plurality of tool receiving means each including a holding means, which is provided with a clamping device, for inserting and securely clamping a base of a tool as well as a clamping element having a predetermined direction of movement for tightening and releasing the clamping device, and also comprising a tool gripping device having an actuating device adapted to be coupled to the clamping element. To avoid the necessity of moving a tool, which is to be interchanged, in two directions during tool changing, this tool changing apparatus is designed such that, in a tool receiving means, the slide-on direction of the holding means, the axial direction of the clamping element and the coupling direction of the actuating device for the clamping element are all parallel to one another and that the tool gripping device may be moved towards the tool receiving means transversely to the row formed by these tool receiving means and parallel to the slide-on direction.

8 Claims, 9 Drawing Figures

TOOL CHANGING APPARATUS FOR A MACHINE TOOL

The invention relates to a tool changing apparatus for a machine tool comprising an indexable tool carrier having a plurality of tool receiving means forming a row, at least a number of these tool receiving means each having a holding means for sliding and clamping a base of a tool onto the respective tool receiving means, the holding means being provided with a clamping device and adapted to be brought into a tool-changing position, we well as a clamping element for tightening and releasing the clamping device, this clamping element having an axis, and also comprising a tool gripping device including an actuating device adapted to be coupled to the clamping element, this tool gripping device being displaceable towards a tool holding means located in tool-changing position in a direction transverse to the row formed by the tool receiving means and transverse to the axis of an inside diameter working tool also located in tool-changing position as well as at least approximately parallel to the axis of the clamping element of the tool holding means and the coupling direction of the actuating device for the clamping element extending parallel to the direction of displacement of the tool gripping device. A tool changing apparatus of this type may be derived from German laid-open paper DE-OS No. 33 24 312. This discloses a tool changing apparatus of the aforementioned type but for a tool adapted to be mounted on a spindle of a machine tool. In the known construction, the holding means of the tool receiving means is designed as a cylindrical journal concentric to the machine spindle. The tool base, which has a cylindrical recess, may be pushed onto this cylindrical journal in the direction of the axis of an inside diameter working tool and, therefore, of the machine spindle. The tool base has two threaded bores extending at right angles to the direction of insertion of the holding means or rather the tool base. These bores are provided for a clamping element in the form of a screw having a conical inner end and for a screw having a concial recess in its inner end, between which a clamping bolt is located. This bolt is displaceably guided in a smooth transverse bore provided in the journal forming the holding means. The bolt has a conical recess in its end facing the clamping element and is of a conical design at its other end. The various conical regions are offset relative to one another in a direction transverse to the axial direction of the holding means such that the tool base is drawn in axial direction against a stop face of the tool receiving means and securely clamped when the screw forming the clamping element is tightened. This is the aim of the known construction. In this way, the rearward annular face of the tool base is intended to be pressed with considerable initial stressing force onto the front end face of the tool receiving means so that, in the case of an inside diameter working tool, as great a proportion of the drive torque as possible is transferred by friction contact from the end face of the tool receiving means to the tool base. A tool gripping device is moved towards the tool base from the side, i.e. transversely to the axis of the tool receiving means, for the purpose of gripping the tool and has two surfaces which form a prism and abut against the periphery of the tool base. This tool gripping device has a screwdriver means which is oriented at right angles to the axis of the tool base and may be coupled to the screw forming the clamping element when the tool gripping device is moved towards the tool. The known tool changing apparatus therefore has the advantage that the tool gripping device for grasping the tool and the actuating device for the clamping element may be moved towards the tool in the same direction to grip the tool and couple the actuating device to the clamping element. The known tool changing apparatus does, however, have numerous disadvantages. The tool gripping device, for example, must be able to move in two directions at right angles to one another, namely carry out a first movement to approach and grip the tool base and a second movement at right angles to the first to withdraw the tool from the holding means. For this reason alone, the known tool changing apparatus is relatively complicated in its construction and also requires a relatively long time for changing a tool. In addition, the known construction necessitates an exact fit between the cylindrical recess of the tool base and the journal forming the holding means of the tool receiving means to ensure that the tool is eactly aligned in relation to the axis of the tool receiving means. This means that the tool gripping device must be exactly positioned and moved in the direction of the axis of the tool receiving means for the purpose of sliding a tool onto the holding means despite the fact that the journal forming the holding means is slanted at its lead-in end. This manner of mounting the tool on the tool receiving means also requires exact external dimensions for the tool base and the support faces for the tool base on the tool gripping device because, otherwise, the tool base could not be slipped onto the holding means despite exact positioning of the tool gripping device. This is not altered in any way by the fact that the lead-in side of the journal forming the holding means is slanted. If tool base and tool receiving means are not coaxially aligned exactly in relation to one another, the fit between the cylindrical recess in the tool base and the cylindrical journal of the tool receiving means will result in the tool tilting in relation to the tool gripping device or to tilting of the assembly consisting of tool and tool gripping device. For this reason, there is the risk of the tool becoming jammed while it is being slipped onto the holding means since the circumferential position of the tool is determined by the tool gripping device and that of the holding means by the tool carrier or rather by a positioning device for the tool carrier. This risk of the tool becoming wedged is particularly prevalent at the customary grooves and groove blocks of tool base and tool receiving means.

In a relatively widely used tool changing apparatus (GB-A-2 126 929) the base of a tool to be mounted on a tool receiving means is inserted into a holding means of the tool receiving means in a direction extending at right angles to a plane defined, in the case of an outside diameter working tool, by the two feed directions of the tool. The tool base has a circular-cylindrical recess which is open at the rearward edge and with which the tool base is pushed onto a correspondingly designed head of a clamping element. This clamping element is tightened in the direction of the axis of an inside diameter working tool, such as a boring tool, for the purpose of clamping the tool. If the tool receiving means is provided on a tool carrier, such as a so-called star turret, the direction of movement of the clamping element extends radially to the indexing axis of the tool turret. Finally, the tool base has on its outer circumference two groove-like points of engagement for a tool gripping device. These points of engagement are diametrally opposite one another and extend in the direction of insertion. The problems incurred when such systems are used on an indexable tool carrier become apparent from this known tool changing apparatus. If a tool turret of the customary type (e.g. a so-called disc, star or crown turret) is equipped with this known tool system, any tool to be changed must be moved out of its associated tool receiving means and towards an adjacent tool, i.e. the known tool changing apparatus necessitates movements towards adjacent tools of the tool carrier during tool changing. For this reason, the tool receiving means and, therewith, the tools must be arranged on the tool carrier at considerable distances from one another so that a tool to be changed may be withdrawn completely from the associated tool receiving means without colliding at all with one of the adjacent tools. This results in tool turrets which have large diameters and require machines with correspondingly large dimensions. It is also a disadvantage when the tool gripping device of this known tool changing apparatus has to be displaced in two directions extending at right angles to one another, namely in a first direction to slide a tool out of a tool receiving means and in a second direction to then remove the tool from the vicinity of the tool carrier. This movement towards an adjacent tool during tool changing entails a risk for any person operating the machine who wishes to slide the tool manually out of a tool receiving means since this person could injure his hand on the adjacent tool. Finally, the arrangement of the points of engagement for a tool gripping device on two opposite points of the tool circumference is disadvantageous since the extent to which the tool gripping device is opened is then dependent on the dimensions of the tool base and possibly increases, still further, the space required between adjacent tool receiving means. In this known tool changing apparatus, two web-like extensions on the tool base are spread apart by the clamping element located between them during clamping of the tool. The web-like extensions which are relatively short in the actuating direction of the clamping element are hereby deformed but still determine the positioning accuracy of the tool. In the case of an outside diameter working tool, the main cutting force consequently leads to a pliability of the known tool system which considerably impedes the positioning accuracy of the tool cutting edge. Moreover, a gap results between the head of the clamping element and the edge of the recess in the tool base, which accommodates the clamping element, during clamping of a tool by axially tightening the clamping element. Dirt and fine shavings may then become caught in this gap and possibly obstruct and prevent release of the tool and, therewith, a tool change. Finally, the clamping element of the known tool system is positioned and actuated in the direction of the longitudinal axis of an inside diameter working tool. This causes considerable difficulty in the construction of driven inside diameter working tools as their drive shafts must be accommodated in the same place as the clamping element.

The object underlying the invention was to provide, for a machine tool comprising an indexable tool carrier with a plurality of tool receiving means forming a row, a tool changing apparatus for changing the tools in this tool carrier which enables the spaces between the tool receiving means of the tool carrier to be kept relatively small and, on the other hand, allows the tool gripping system to be kept relatively simple.

To accomplish this object it is suggested that a tool changing apparatus of the type discussed at the outset be designed in accordance with the invention such that the slide-on direction of a tool base towards a tool holding means located in tool-changing position and therewith the direction of guidance of the tool holding means likewise extend transversely to the axis of an inside diameter working tool located in tool-changing position and parallel to the direction of displacement of the tool gripping device. In the inventive tool changing apparatus, the direction in which the tool gripping device is moved towards a tool holding means in tool-changing position, or rather towards a tool, the direction in which the actuating device for the clamping element is coupled with the clamping element, the direction in which the clamping element is displaced and the direction in which the tool base is inserted or slipped into the tool receiving means are unidirected. This means that the tool gripping device need be displaceable only in one direction (e.g. in the opposite direction) to grip a tool to be changed, to couple an actuating device for the clamping element, such as a screwdriver, to the clamping element and to withdraw the tool from the tool receiving means. The constructional resources required for the tool gripping system and the time taken to change a tool may therefore be considerably reduced. In addition, the actuating device for the clamping element, which is preferably designed as a screwdriver spring-loaded in axial direction, need be displaceable only in the same direction even though, of course, constructions could be considered, which are less advantageous than those covered by the invention and in which the direction of movement of the clamping element and, with it, the direction of movement of the actuating device for the clamping element when actuating this clamping element extend obliquely to the direction of movement of the tool gripping device and to the slide-on direction of the tool. In the inventive tool changing apparatus the tool receiving means may have relatively little space between one another in the direction of the row they form and so a tool turret having a predetermined number of tool receiving means may be designed to have a relatively small diameter since movement for changing a tool is not towards one of the adjacent tools but transversely thereto. This also rules out any risk of injury, as described above, when a tool is changed manually. The advantage of the small dimensions required for the tool turret applies accordingly for a tool magazine, from which the tools are transported to the tool carrier and back again by the tool gripping device. Finally, it is also within the scope of the invention for the tool carrier to be moved towards the tool gripping device instead of moving the tool gripping device towards the tool carrier and then away again. The tool carrier may also have more than one row of tool receiving means, be linearly displaced for the purpose of indexing or—as in the case of a tool turret—be rotated about an indexing axis which need not, however, extend at right angles to the axis of rotation of a workpiece.

To make it possible for a tool to be gripped by the tool gripping device even when the tool receiving means are located close together, it is recommended that, on its side facing the tool gripping device in the slide-on direction, the tool be provided with points of engagement for movable gripping elements of the tool gripping device. As the tool is not gripped by the tool gripping device on its outer circumference, the invention opens up the possibility of handling tools of varying sizes without altering the extent to which the tool gripping device has to be opened. Even if the tools are of different sizes, the points of engagement for the gripping elements of the tool gripping device may always be designed in the same way and arranged at the same distance from one another on one side of the tools.

In a particularly advantageous embodiment of the inventive tool changing apparatus, the gripping elements may be released from the tool at the same time as the clamping element is tightened. It is then no problem if the direction of movement of the tool gripping device does not exactly coincide with the slide-on or slide-in direction defined by the holding means of the tool receiving means, e.g. if it is slightly inclined or somewhat offset in relation to the slide-on direction. The tool can then move somewhat in relation to the tool gripping device at the same moment as secure clamping of the tool base in the tool receiving means is commenced. It is merely necessary in this case to design the holding means of the tool receiving means such that the tool base may be slipped into or onto the holding means in such a manner that a certain clearance is left. A construction of this type makes relatively minimal demands on the precision of the tool gripping system.

The inventive tool changing apparatus enables a defined operative position of the tool in the tool receiving means to be located in a simple manner in that the tool base is provided with a stop region abutting on the tool receiving means when a tool is completely inserted into the holding means of a tool receiving means. In this case, it is recommended that the points of engagement be provided in this stop region.

In an especially preferred embodiment of the inventive tool changing apparatus, the tool gripping device has a common drive for the movable gripping elements and the actuating device for the clamping element. This is possible because the clamping element must always be actuated first, when a new tool is inserted into a tool receiving means, before the gripping elements of the tool gripping device can release the new tool. When a tool is removed from the tool carrier, the gripping elements grasp the tool first before the clamping element is released. This enables the use of one and the same drive means for actuating the gripping elements and the clamping element one after the other. In order to ensure that the clamping element is always tightened with the same torque, once a tool is inserted in a tool receiving means, whereupon the tool gripping device is released from the tool, a particularly simple embodiment of the inventive tool gripping device has a drive which is coupled to the actuating device for the clamping element via a torque-controlled coupling and the gripping elements are adapted to be actuated by this coupling. This ensures in a simple manner that with one and the same drive the clamping element is always tightened first of all with a predetermined torque and the drive then coupled with the gripping elements of the tool gripping device when a new tool is to be interchanged.

In a preferred embodiment of the inventive tool changing apparatus, the holding means is designed such that it positively embraces a tool base inserted into the holding means on both sides of a central plane of the holding means, this central plane extending parallel to the axis of the clamping element. For this purpose, the holding means is preferably designed as a sliding guideway having a prismatic cross section and extending in the slide-on direction. In a holding means of this type it is then particularly easy for the tool base in the holding means to be adapted to be pressed by the clamping device against stop faces of the holding means in two directions at right angles to the insert direction and to one another. These features are known per se from German published application DE-AS No. 23 58 405. This state of the art discloses a boring bar tool, with which the holding means of the tool receiving means is a sliding guideway having a prismatic cross section. A tool base comprising a dovetailed groove may be slipped onto this guideway. The holding means is, however, spread apart and the tool base clamped by means of a screw forming a clamping element and extending at right angles to the slide-on direction of the tool base. If this construction were to be utilized on a tool carrier comprising one row of tool receiving means, then the clamping element would have to be actuated or a tool changed from the direction of an adjacent tool. This has the known disadvantages that greater distances would then be necessary between adjacent tools of the tool carrier and the risk of injury during manual tool changing could not be avoided.

If the tool carrier is displaceable in two feed directions defining a plane of movement through a point of the tool carrier, it is recommended that the inventive tool changing apparatus be designed such that the slide-on direction of a tool holding means located in tool-changing position extends at least approximately parallel to this plane of movement.

No additional space is required for the area in which the tool gripping device is displaced when, in the case of a machine tool comprising a tool carrier arranged adjacent a working space, the tool gripping device is adapted to be moved towards the tool carrier from this working space.

In principle, the inventive tool changing apparatus may be designed such that a tool can always be exchanged when the associated tool receiving means takes up a predetermined position (tool-changing position). It may often be appropriate, however, to utilize the working position as tool-changing position, i.e. the position of a tool holding means in which machining is carried out by the tool associated with this tool holding means.

Additional features, advantages and details of the invention result from the following description as well as the attached drawings of two preferred embodiments of the inventive tool changing apparatus. In the drawings.

Figure 1:
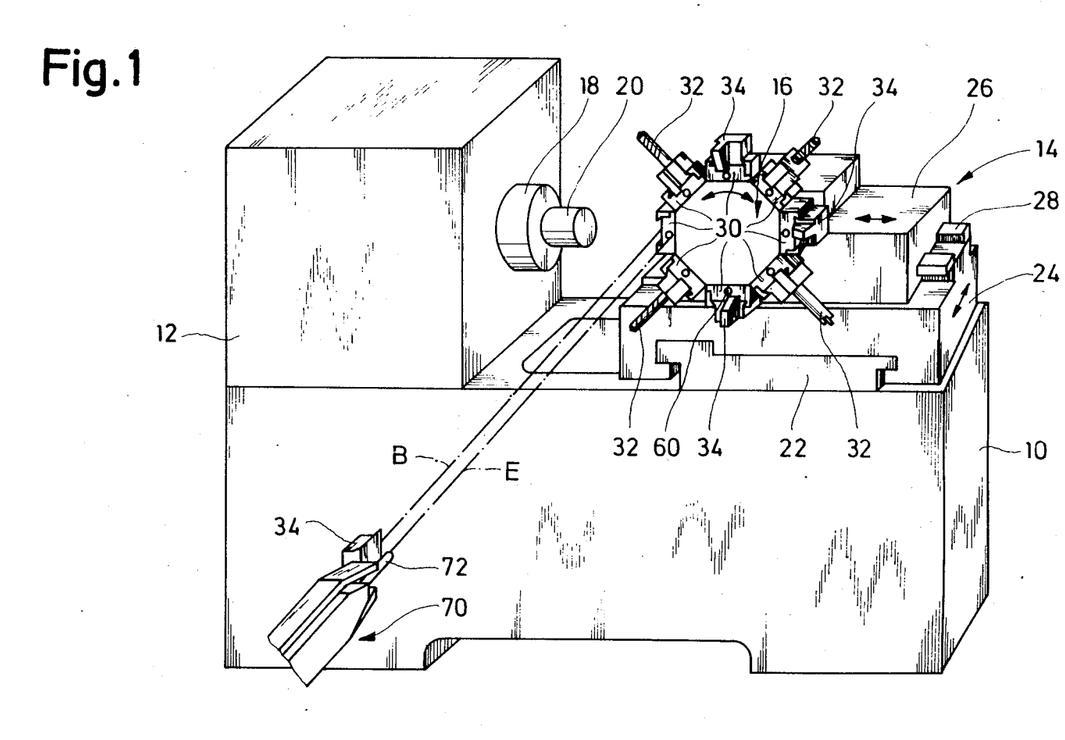
FIG. 1 is a schematic perspective illustration of a lathe equipped with the inventive tool changing apparatus but without the operating apparatus bearing the tool gripping device as this operating apparatus may be any suitable, known construction.

FIG. 1 shows a lathe comprising a machine frame 10, a headstock 12 and a cross slide system 14 bearing a tool turret 16. A main work spindle which is not illustrated is rotatably mounted in the headstock 12. The main work spindle is provided with a drive means and mounts a chuck 18 on its front end, with which a workpiece 20 to be machined may be held. The cross slide system 14 comprises a cross guide 22, which is mounted on the machine frame 10 and on which a cross slide 24 is displaceably guided, and a longitudinal slide 26, for which a longitudinal guide 28 is mounted on top of the cross slide. The directions of movement of the two slides have been indicated in FIG. 1 by double-headed arrows. The drive means associated with the two slides 24 and 26 have been omitted for the sake of simplicity. The tool turret 16 is mounted on the longitudinal slide 26 for rotation about a horizontal turret indexing axis extending transversely to the axis of the main work spindle. The drive means for rotating the tool turret 16 has also not been illustrated for the sake of simplicity.

The tool turret 16 has eight tool receiving means 30 which are arranged at the same angular distance from one another and can each hold an inside diameter working tool 32 or an outside diameter working tool 34.

Figure 2:
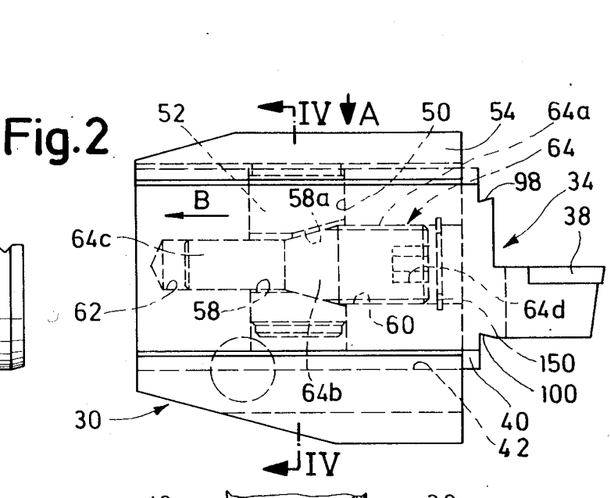
FIG. 2 is a front view of an outside diameter working tool inserted and clamped in a tool receiving means.
Figure 3:
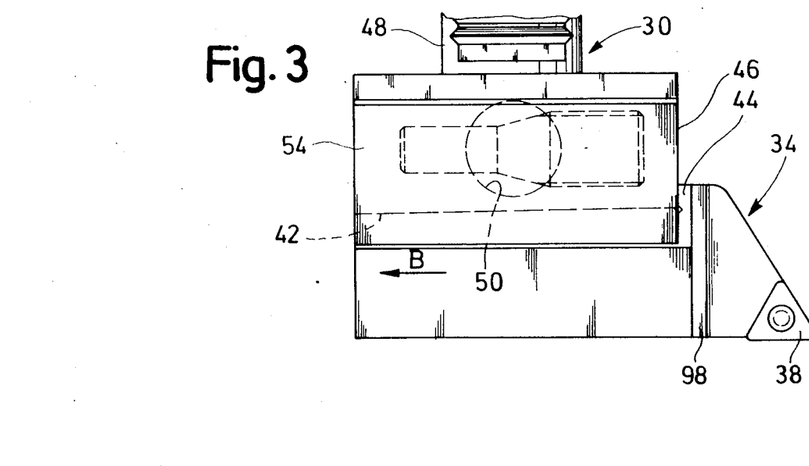
FIG. 3 is a plan view of this tool and part of the tool receiving means mounting the tool, seen in the direction of arrow A in FIG. 2.
Figure 4:
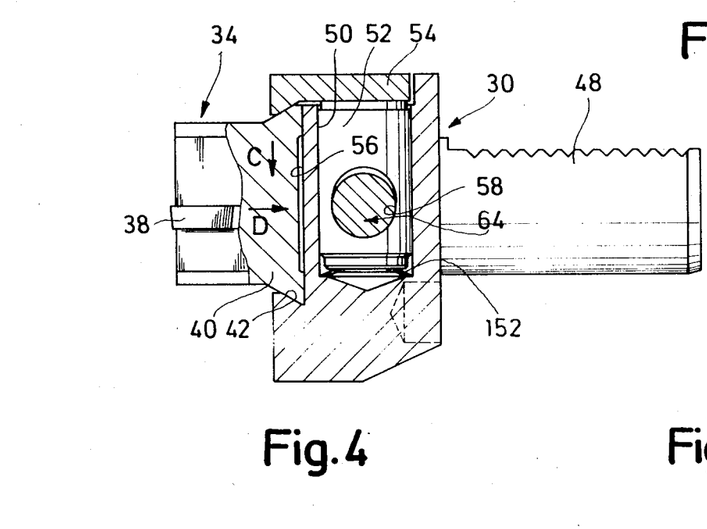
FIG. 4 is a section through the tool and tool receiving means along the line IV—IV in FIG. 2.

In the following, the inventive construction of the tool receiving means and the tools will be explained on the basis of FIGS. 2 to 4 depicting an outside diameter working tool 34.

FIGS. 2 to 4 show an outside diameter working tool designated as a whole as 34. This bears a small cutting plate 38 and is provided with a base 40 which may be slipped into a prismatic sliding guideway 42 of the tool receiving means 30, in the direction of arrow B illustrated in FIGS. 2 and 3, until a stop plate 44 on the tool base 40 rests against a stop face 46 of the tool receiving means 30 (see in particular FIG. 3). A holding shaft of the tool receiving means has been designated 48. The tool receiving means 30 is preferably provided with a guide bore 50 which is, in particular, closed on one side and extends at right angles to the insert direction B and to the axis of the holding shaft 48. A clamping bolt 52 is seated in this guide bore. In accordance with the invention, a clamping shoe 54 is, in particular, integrally connected to this clamping bolt 52. The left-hand portion of the clamping shoe, according to FIG. 4, forms the sliding guideway 42 together with the actual body of the tool receiving means 30. If the clamping bolt 52 is drawn downwards, according to FIG. 4, in a manner still to be described, the inclined positions of the upper and lower flanks of the sliding guideway 42 have the effect that the tool base 40 is displaced in the directions of arrows C and D and is therefore not only clamped between the inclined flanks of the sliding guideway but also pressed against the base surface 56 of the guideway 42.

According to the invention, the clamping bolt 52 includes a transverse bore 58 comprising a conical portion 58a (cf. FIG. 2). The axis of this bore extends parallel to the axis of the sliding guideway 42, i.e. to the insert direction B. In accordance with the invention, a threaded bore 60 and a guide bore 62 are provided in the body of the tool receiving means 30 on both sides of the guide bore 50 as extensions of the transverse bore 58. These two bores serve to accommodate a clamping element 64 designed as a tightening screw and comprising a cylindrical threaded section 64a, a conical section 64b and a smooth cylindrical guide section 64c. The clamping element 64 is provided with a hexagonal recess 64d so that it may be turned by a screwdriver means introduced through the threaded bore 60 which is open to the right in FIG. 2. The guide bore 62 and the guide section 64c of the clamping element 64 serve mainly to support the conical section 64b which abuts on the conical portion 58a of the transverse bore 58 when the clamping element 64 is screwed to the left, according to FIG. 2, and thereby draws the clamping shoe 54 downwards, according to FIGS. 2 and 4.

It should also be mentioned that the holding shaft 48 corresponds to a German Industrial Standard and that the tool turret 16 has, in a manner known per se, openings for receiving the holding shafts of the tool receiving means 30 as well as attachment means for securing the holding shafts in the tool turret. Since these are, however, known constructional features it is unnecessary to illustrate and describe these features in detail.

In FIG. 1, a tool gripping device 70 is illustrated schematically, holding an outside diameter working tool 34. As will be shown later in detail, the tool gripping device is provided with a hexagonal screwdriver means 72 which may be inserted into the hexagonal recess 64d of the clamping element 64 when the tool gripping device approaches a tool receiving means 30. In accordance with the invention, a tool is intended to be exchanged into that tool receiving means 30 which would hold a tool in its operative position if it were equipped with one. This tool receiving means has been illustrated in FIG. 1 without a tool. The path of movement of the outside diameter working tool 34 which is to be interchanged and, with it, the insert direction of the tool receiving means 30 located in operative position has also been designated as B in FIG. 1, the path of movement of the screwdriver means 72 of the tool gripping device as E. The latter path is aligned with the axis of the threaded bore 60 of the tool receiving means 30 located in operative position. The two paths of movement B and E are, in accordance with the invention, parallel to one another and to the plane of movement which is defined by the two feed directions, as determined by the slides 24 and 26, of the tool which may be held by that tool receiving means 30 of FIG. 1 which is still free.

Figures 5, 6:
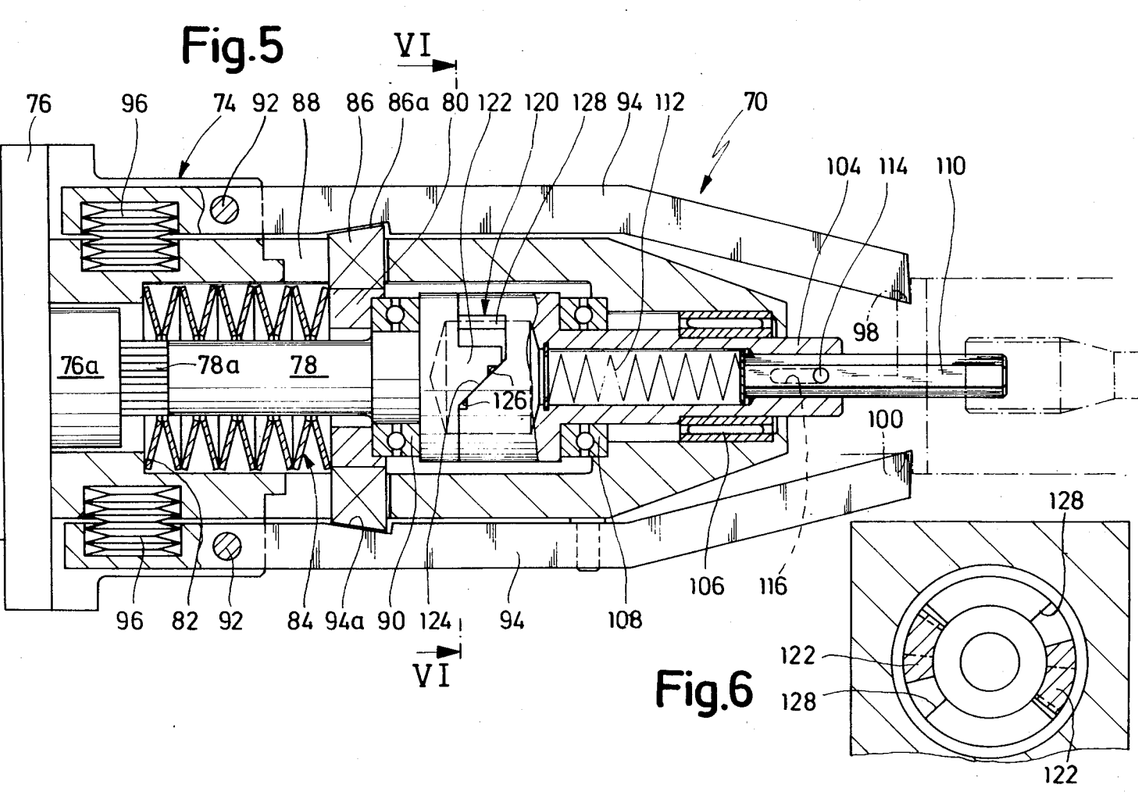
FIG. 5 is an axial section through the tool gripping device, in which a tool with tool holding means has been indicated by a dash-dot line and the tool gripping device has grasped the tool.
FIG. 6 is a section along line VI—VI in FIG. 5.

First of all, the construction of the tool gripping device 70 is to be explained in greater detail on the basis of FIGS. 5 and 6. It comprises a housing 74 to which a drive motor 76 is flanged. This motor may be, for example, an electric or a hydraulic motor. It comprises a drive shaft 76a for driving an axially displaceable intermediate shaft 78. This intermediate shaft is connected to the drive shaft 76a by means of a splined portion 78a so as not to be rotatable relative to the drive shaft but may, however, be displaced further to the left, according to FIG. 5, into an axial opening in the drive shaft 76a which is designed to correspond to the splines. A pressure spring 84 is arranged between a pressure plate 80, which is axially displaceable in the housing 74, and a shoulder 82 of the housing 74. The pressure spring endeavours to hold the pressure plate 80 in its right-hand end position shown in FIG. 5. Projections 86 are formed on the pressure plate 80 and each penetrates a slot 88 in the housing 74. These projections have outer inclined faces 86a. To enable the pressure plate 80 to be taken along by the intermediate shaft 78 when this moves to the left, as will be described later, the intermediate shaft has an axial bearing 90, against which the pressure plate 80 is supported in axial direction in its right-hand end position, under the influence of the pressure spring 84, so that the axial bearing defines this end position. Two gripping element 94 are pivotally mounted on the housing 74 by means of bearing pins 92. These gripping elements are designed as twin-armed levers and have inclined faces 94a which abut against the inclined faces 86a of the pressure plate 80 under the influence of pressure springs 96 associated with each element. If the pressure plate is displaced to the left out of the position shown in FIG. 5, the gripping elements 94 are pivoted apart, i.e. the tool gripping device 70 is opened. To enable the gripping device to grasp a tool 32 or 34, points of engagement 98 and 100 are provided on the stop plate 44 of each tool (cf. FIGS. 2, 3 and 5). The gripping elements 94 can engage these points of engagement when the tool gripping device 70 closes and can grip a tool securely thanks to the inventive construction of the gripping elements and points of engagement illustrated in the drawings. To enable all the parts mounted in the housing to be assembled, this housing is divided transversely to its longitudinal axis (in a manner not illustrated) in the region of the slots 88.

A screw driver shaft 104 is rotatably mounted in the housing 74 by means of a pin bearing 106 and an axial bearing 108 and is non-displaceable in axial direction. This screw driver shaft which is designed as a hollow shaft accommodates a hexagonal screw driver means 110 which is held in the screw driver shaft so as to be non-rotatable but axially displaceable and is subject to the action of a pressure spring 112 which holds the screw driver means 110 in its right-hand end position shown in FIG. 5. The latter is defined by a stop pin 114 which is mounted in the screw driver 110, penetrates an elongated hole 116 in the screw driver shaft 104 and thus limits the axial displacement of the screw driver relative to the screw driver shaft.

In accordance with the invention, a torque-limiting claw coupling 120 is provided between the intermediate shaft 78 and the screw driver shaft 104. The coupling has as essential elements coupling claws 122, inclined slide faces 124, stops designed as shoulders 126 for these coupling claws as well as entraining faces 128.

The mode of operation is as follows:

The moment the tool 34 (cf. FIG. 1) is inserted into the tool receiving means 30 located in operative position (in principle, it is also possible for a tool to be inserted into a tool receiving means taking up a different position), the stop plate 44 strikes the stop face 46. The drive motor 76 is now switched on by means of a limit switch which is not illustrated and the clamping element 64 thereby screwed to the left in accordance with FIG. 2. When the clamping element 64 is then displaced to the left in FIG. 2, it clamps the tool base 40 of the interchanged tool firmly in the sliding guideway 42 since, according to the invention, any tightening of the clamping element 64 results in a clamping movement of the clamping shoe 54.

Figure 7:
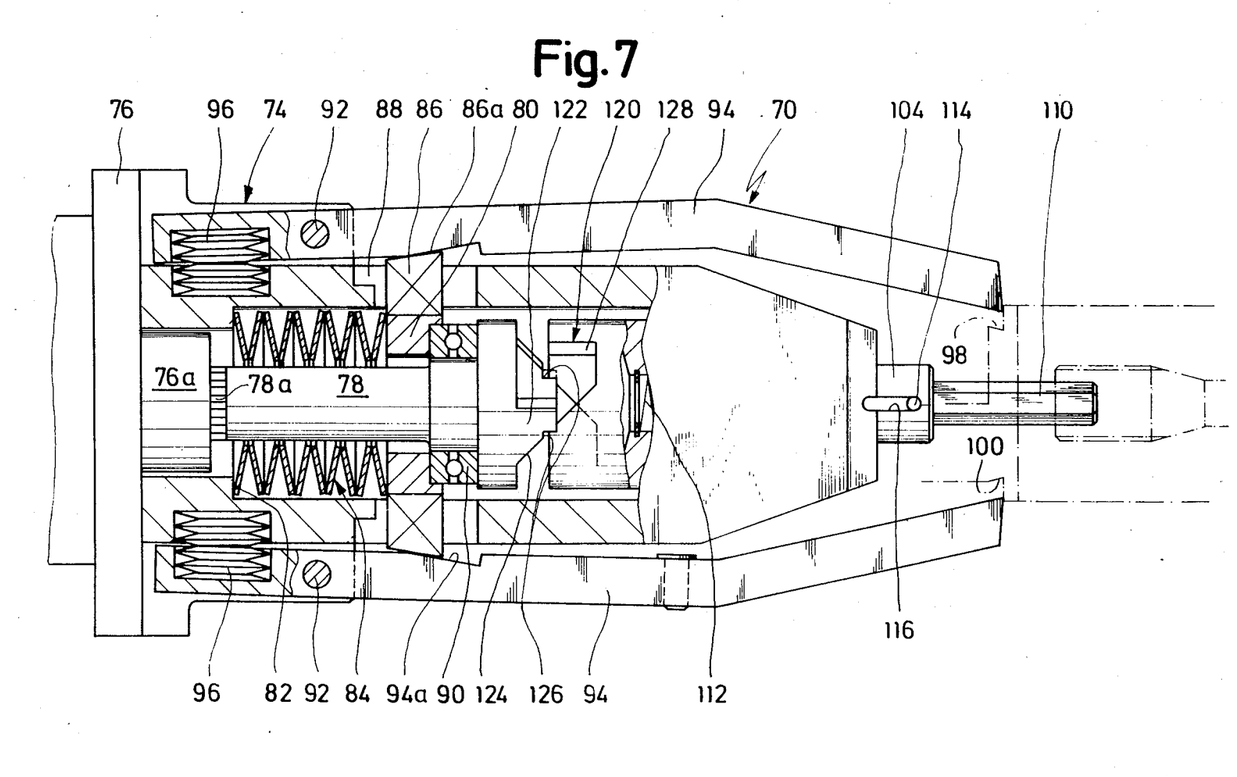
FIG. 7 is an illustration corresponding to FIG. 5 after the clamping element has been tightened and the tool gripping device opened, i.e. the gripping elements of the tool gripping device have been released from the tool.

Once the predetermined clamping force is attained (this is determined, in accordance with the invention, by the axial force of the pressure spring 84), the screw driver shaft 104 ceases to turn and the coupling claws 122 slide along the inclined slide faces 124 until they abut on the shoulders 126. This state is illustrated in FIG. 7. The intermediate shaft 78 is hereby displaced to the left according to FIG. 5, it takes the pressure plate 80 with it and the projections 86 of this plate push the gripping elements 94 apart from one another so that the tool gripping device 70 opens and releases the tool 34. The drive motor 76 is switched off in this position by switching elements which are not illustrated. The tool gripping device 70 can now be withdrawn into its original position illustrated in FIG. 1.

A tool is collected from the tool turret 16 or a tool magazine, which is not illustrated, in the reverse sequence. An opened tool gripping device 70 is moved towards a tool 32 or 34 located in tool-changing position (see FIG. 7) until the gripping elements 94 are located above the points of engagement 98, 100. The drive motor 76 is now switched on by means of switching elements which are not illustrated, such that it rotates in the opposite direction to before. The hexagonal screw driver means 110 is then coupled with the clamping element 64. The latter does, however, arrest the screw driver shaft 104 since the clamping element 64, which is designed as a tightening screw, of a tool still mounted in the tool receiving means is securely seated. When the intermediate shaft 78 is rotated further the coupling claws 122 again slide along the inclined slide face 124 until they strike the entraining faces 128 and thereby abruptly apply the torque of the drive motor 76 to the screw driver means 110. The latter therefore acts as a drive screw during release of the clamping element 64. At the same time, the pressure plate 80 has moved towards the right in FIG. 7 so that the gripping elements have been pivoted towards one another and grasped the tool to be changed. The drive motor 76 now turns the clamping element 64 back to the right, in accordance with FIG. 2, until it abuts on a snap ring 150 whereupon switching elements which are not illustrated switch off the drive motor 76 due to its rising torque. It would, of course, also be possible to provide a limit switch actuated by the clamping element 64. When the clamping element 64 releases the clamping bolt 52 this is pressed upwards by a pressure spring 152 (cf. FIG. 4) such that the clamping shoe 54 releases the tool base 40. Finally, the tool gripping device 70 draws the tool to be changed forwards along the path of movement B, out of the working space of the machine tool, and transfers it to a tool magazine which is not illustrated.

Figures 8, 9:
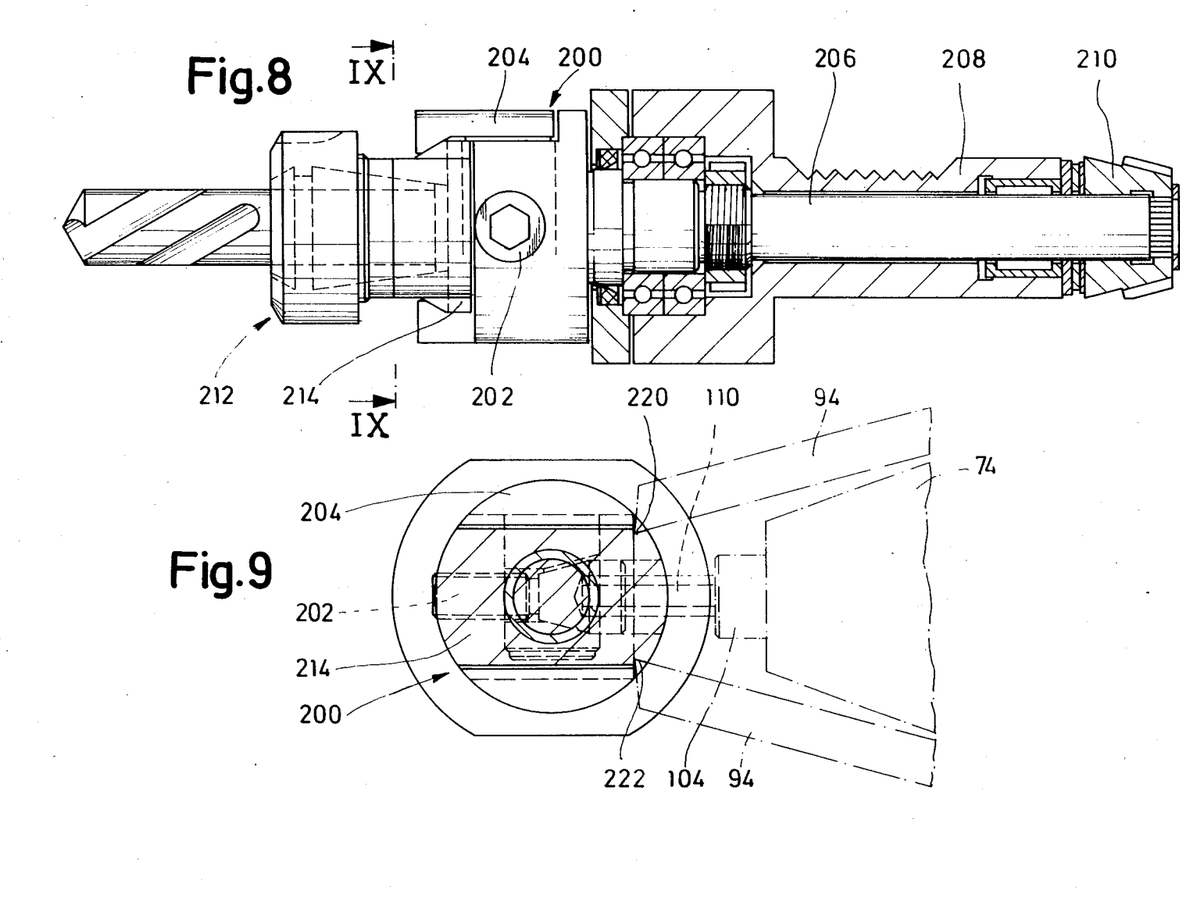
FIG. 8 is an illustration of a driven inside diameter working tool together with tool receiving means, partially as a side view and partially as an axial section.
FIG. 9 is a section along line IX—IX in FIG. 8 with the addition of the front region of the tool gripping device indicated as a dash-dot line.

The embodiment of an inventive tool system for a driven inside diameter working tool, as illustrated in FIGS. 8 and 9, is now described only insofar as differences necessary for comprehension are to be found between this embodiment and the embodiment of FIGS. 1 to 7.

A tool receiving means 200, with clamping element 202 and clamping shoe 204, is mounted on a drive shaft 206 which is rotatably mounted in a holding shaft 208 and bears a coupling element 210 on its right-hand end, according to FIG. 8. The inside diameter working tool which is designated as a whole as 212 has a tool base 214 which may be secured in the tool receiving means 200 with the aid of the clamping element 202 and the clamping shoe 204 and in the manner described in conjunction with FIGS. 1 to 7. Points of engagement 220 and 222 on one side of the tool receiving means 200 again serve for gripping of the tool with the aid of the gripping elements 94 of the tool gripping device 70, the screw driver means of which is indicated at 110.

The drive shaft 206 is driven in the known manner by drive elements which are provided in the tool turret 16 and may be stopped by a positioning device, which is also known, such that the tool receiving means 200 is correctly positioned in relation to the tool gripping device 70.

FIGS. 8 and 9 show that the elements required for driving a tool do not collide in any way with the elements serving to clamp the tool in the tool receiving means. This is not the case in the known tool changing apparatuses.

As shown in the illustrations of the various embodiments, a particular advantage of the inventive construction is the fact that when a tool is inserted into a tool receiving means dirt collected in its sliding guideway is pushed backwards out of the tool receiving means and cannot result in any problems.

FIG. 1 shows particularly clearly that the space required for movement of the tool gripping device is available as operating space for the tools in front of the cutting edges of the tools held in the tool turret 16. This means that no additional space need be created for movements required for tool changing.

The "operating space" for the lathe depicted in FIG. 1 is understood by all persons skilled in the art to be the space to the right of the chuck 18 and in front of the cutting edges of the inside and outside diameter working tools 32 and 34, respectively.

What is claimed is:

1. A tool changing apparatus for a machine tool comprising a working space and an indexable tool carrier (16) located adjacent said working space and having a plurality of tool receiving means (30) forming a row, at least a number of said tool receiving means having a holding means (42) for sliding and clamping a base (40) of a tool onto the respective tool receiving means, at least one of said bases carrying an inside diameter working tool (32) having a tool axis, said holding means being provided with a clamping device (52) and adapted to be brought into a tool-changing position, as well as a clamping element (64) for tightening and releasing said clamping device, said clamping element having an axis, and with a tool gripping device (70) including an actuating device (110) adapted to be coupled in a coupling direction to the clamping element, means for displacing the tool gripping device (70) along a transfer path (E) towards a tool holding means located in tool-changing position in a direction of displacement being transverse to the row formed by said tool receiving means and transverse to the tool axis of an inside diameter working tool (32) located in tool-changing position as well as at least approximately parallel to the axis of said clamping element (64) of the tool holding means (42) located in tool-changing position, said coupling direction extending parallel to said direction of displacement of the tool gripping device, the improvement comprising:
   (a) the slide-on direction (B) of a tool base (40) towards a tool holding means (42) located in tool-changing position extends transversely to the tool axis of an inside diameter working tool (32) located in tool-changing position and parallel to the direction of displacement of said tool gripping device (70);
   (b) the tool gripping device (70) has mounting means (74) on which tool gripping elements (94) for holding a tool are movably mounted, and
   (c) the tool gripping device (70) comprises a common drive means (76) for moving said tool gripping elements (94) and for driving said clamping elements actuating device (110).

2. Apparatus according to claim 1, wherein means (96) are provided for releasing said gripping elements (94) from said tool at the same time as said clamping element (64) is tightened.

3. Apparatus according to claim 1, wherein the tool base (40) is provided with a stop region (44) abutting on a tool receiving means when said tool is completely inserted into the holding means (42) of said tool receiving means (30).

4. Apparatus according to claim 3, wherein said stop region (44) is provided with points of engagement (98, 100) for said tool gripping elements (94).

5. Apparatus according to claim 1, wherein said drive means (76) is coupled to said actuating device (110) for said clamping element via a torque-controlled coupling (120) and said tool gripping elements (94) are adapted to be actuated by said coupling.

6. Apparatus according to claim 1, wherein said holding means (42) is designed such that it positively embraces a tool base (40) inserted into said holding means on both sides of a central plane of said holding means, said central plane extending parallel to the axis of said clamping element (64).

7. Apparatus according to claim 1, wherein said holding means (42) is designed as a sliding guideway having a prismatic cross section and extending in said slide-on direction (B) and wherein said holding means has a clamping member (54) displaceable by said clamping element (64) transversely to its axis and transversely to the axis of an inside diameter working tool (32) held by said holding means (42), said clamping member forming one flank of said prismatic sliding guideway (42).

8. Apparatus according to claim 1, wherein said transfer path (E) extends from the tool carrier (16) into the working space of the machine tool.

* * * * *